United States Patent
Zhou et al.

(10) Patent No.: US 10,387,275 B2
(45) Date of Patent: Aug. 20, 2019

(54) RESUME HOST ACCESS BASED ON TRANSACTION LOGS

(71) Applicant: HEWLETT PACKARD ENTERPRISE DEVELOPMENT LP, Houston, TX (US)

(72) Inventors: Feng Zhou, Fremont, CA (US); Jin Wang, Cupertino, CA (US); Srinivasa D. Murthy, Cupertino, CA (US); Wei Wang, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 15/219,613

(22) Filed: Jul. 26, 2016

(65) Prior Publication Data
US 2018/0032412 A1   Feb. 1, 2018

(51) Int. Cl.
G06F 11/14 (2006.01)
G06F 16/182 (2019.01)
G06F 16/18 (2019.01)
G06F 11/20 (2006.01)

(52) U.S. Cl.
CPC ...... *G06F 11/1474* (2013.01); *G06F 11/1471* (2013.01); *G06F 11/203* (2013.01); *G06F 11/2033* (2013.01); *G06F 11/2048* (2013.01); *G06F 16/182* (2019.01); *G06F 16/1865* (2019.01); *G06F 11/2035* (2013.01); *G06F 11/2097* (2013.01); *G06F 2201/805* (2013.01)

(58) Field of Classification Search
CPC combination set(s) only.
See application file for complete search history.

(56) References Cited

U.S. PATENT DOCUMENTS

| | | | |
|---|---|---|---|
| 6,658,590 B1 * | 12/2003 | Sicola | G06F 11/1471 714/15 |
| 7,107,294 B2 | 9/2006 | Romanufa et al. | |
| 7,305,421 B2 | 12/2007 | Cha et al. | |
| 7,873,605 B2 | 1/2011 | Bhattacharyya et al. | |
| 8,554,734 B1 | 10/2013 | Chatterjee et al. | |
| 8,856,490 B2 | 10/2014 | Chen et al. | |
| 2015/0331760 A1 | 11/2015 | Dalessandro et al. | |

OTHER PUBLICATIONS

Thomson, A. et al; http://cs-www.cs.yale.edu/homes/dna/papers/scalable-calvin.pdf Title: Modularity and Scalability in Calvin: issue date: Jun. 12, 2013.

* cited by examiner

*Primary Examiner* — Amine Riad
(74) *Attorney, Agent, or Firm* — Hewlett Packard Enterprise Patent Department (57) ABSTRACT

Examples disclosed herein relate to processing transaction logs for storage nodes. Multiple nodes manage transactions for storage units including transaction logs. A node assumes control over a set of storage units and blocks host access requests to the storage units. Transaction logs are processed to determine a subset of the set to perform recovery for. In this example, the subset of storage units are locked. Host access requests are resumed.

17 Claims, 4 Drawing Sheets

RESUME HOST ACCESS BASED ON TRANSACTION LOGS

BACKGROUND

Some distributed file systems heretofore use a network of controllers to manage transactions to and from a storage unit. Such controllers may replicate transaction logs amongst themselves. In the event a controller fails, the transaction logs may be used to determine the transactions that were in progress when the controller failed.

BRIEF DESCRIPTION OF THE DRAWINGS

The following detailed description references the drawings, wherein.

DETAILED DESCRIPTION

A computing device may store data in a file system, which may store data in files, directories, or other "file system objects", and may store various meta-data associated with each file system object. In some examples, computing device(s) may store data in a distributed file system (DFS) providing global file system namespace semantics for the storage of the DFS, where different portions of storage of the overall DFS are physically separate from one another, logically separate from one another, or a combination thereof, though accessible to global functionalities of the DFS (e.g., via at least one computer network).

In some examples, a DFS may include a plurality of storage nodes or "nodes," each to manage one or more storage units of the DFS. In some examples, the storage nodes may be physically or logically separate or remote from one another (or a combination thereof) but accessible to one another or to at least one storage node implementing global functions for the DFS (e.g., via at least one computer network). In examples described herein, a storage node may comprise at least one computing device to implement the functionalities of the storage node, including locally managing one or more storage units of the DFS. In other examples, storage nodes may be implemented by a combination of separate physical computing devices and different logical computing devices (e.g., virtual machines or the like).

In examples described herein, a "storage unit" may be a discrete physical and/or logical portion of storage in a DFS that implements its own independent local file system specific to that portion of storage. In some examples, different storage units may be implemented by different storage devices (e.g., different physical disks, drives, etc.), by different portions of a single storage device, or a combination thereof. In some examples, a storage unit managed by an associated storage node may be implemented by at least one storage device physically connected locally to a computing device implementing the storage node, or may be implemented by a portion of a storage array (e.g., a given logical unit of storage identified by a given logical unit number (LUN)).

In examples described herein, meta-data is a set of data that gives information about other data. In the context of a storage system, examples of meta-data include a bitmap, exception tables, log pages, etc.

In one example, a bitmap is used for space management. When the storage system needs space (e.g., for meta-data like an exception table or for data that a host wants to write), the storage system goes through the bitmap list that belongs to that LUN to determine where there is free space and allocate needed space. In some examples, finding free space may include looking through information that is not stored in a main memory of the system node that is looking.

In another example, a "log page" is for a space freeing operation. The log page stores locations where free operation needs to be performed. Consider an example in which LUN 20, offset 120 was originally pointing to logical disk (LD) 1, offset 10, and later, a write full off zeros occurs to LUN 20, offset 120. If the system has a special representation of zero, space is not needed for storing the zero data. As such, LD 1, offset 10 can be freed. Instead of updating bitmap directly, LD 1, offset 10 can be put into the log page, which eventually can be processed by a background thread. In some examples, a transaction log entry can be made for the updating of the log page until it is flushed to a non-volatile memory.

As used herein, the term "exception table" is a data structure that can include virtual volume to logical drive mapping information. For example, the exception table can be made up of address tables that map virtual volume pages to storage units (e.g., logical disk pages). As storage demand grows, additional storage is allocated for the address tables and the data pages from separate pools of storage. If any of the pools runs low, more logical disk regions are allocated to that pool. As such, hosts can be provided access to storage space that can be variable. Further, multiple levels of exception tables can be used to determine a logical/physical location for a storage unit. For example, a first level of exception table can be pointed to and known to each node in the system. The exception table entries can reference a second level of exception tables. Similarly, further layers of exception tables can be used. In one example, a virtual identifier and offset can be used to determine from the first level exception table a second level exception table. Then, the virtual identifier and offset can be used to determine from the second level exception table a mapping to a physical storage unit or another level of exception table. Due to large amounts of storage that can be controlled, the size of exception tables and/or other meta-data data structures can be large e.g., in the order of hundreds of megabytes or larger.

Storage nodes can act as a cache (e.g., to write information) for the storage units. Hosts can request to read from and/or write to the storage units using the storage nodes. Storage nodes in a network may replicate transaction logs amongst themselves for fault tolerance purposes. If one node fails, another storage node may substitute for the failed storage node. By analyzing transaction logs, the substituting storage node may continue from where the failed storage node ended.

Moreover, in a fault tolerant system, a copy of transaction logs and a copy of the cached data (e.g., information to be written) can be kept at two or more nodes. In some examples, the cached data can be implemented as cache memory pages. Further, the write information can include cache memory pages that are marked as dirty (or altered). As such, a storage node that controls a set of storage units can include, in a memory on the storage node, write information as well as transaction logs. The controlling storage node can also copy the transaction logs to another node. Further, the controlling storage node can also copy the write information to another node. Eventually, the write information will be flushed to the corresponding storage units. Moreover, the node with a copy of the transaction logs and the node with the copy of the write information can be the same node. In the fault tolerant system, a goal can be to provide the hosts with at least two copies of the transaction logs and write information when providing host read and write access. As such, when the controlling storage node fails, the storage node receiving control processes the transaction logs to ensure that two copies of the write information and transaction logs exist.

As used herein, the term "transaction log" is a log that includes a location of two copies of data (e.g., the write information) on two nodes, updates to meta-data (e.g., a new exception table entry value), and information about where the data is to be written (e.g., the location of the storage unit, such as a LUN, offset that the host wrote to). When a host writes to a storage unit, the controlling node creates the transaction log and a copy of the transaction log is made at a second node. Further, the write information is included on the controlling node and a copy of the write information is kept at a second node. The copy of the transaction log and the copy of the write information can be on the same node or can be on different nodes.

In one example, during normal operations, an invariant property that the system can provide can be that there are copies of write information and transaction logs when host access is provided to a storage unit. When one node dies, such invariant no longer holds. In this example, the term "playback" is the operation that traverses through transaction logs and create new copies of write information and transaction logs, so that the invariant still holds after playback finishes. There is no assumption that the node that died will come back.

During processing, the input/output (IO) from hosts to the storage units in the set are blocked to ensure fault tolerance. However, this may take time because some of the information used to complete recovery operations associated with the transaction logs may be stored on one of the storage units, which takes more time to page in compared to, for example, main memory of a storage node. As used herein, "main memory" of a node is memory that is directly accessible by a processor of the node. During the time that the host access to IO is blocked, the IO stall time may cause application failures.

Accordingly, various embodiments disclosed herein relate to expediting the amount of time it takes to enable host IO to resume after a storage node fails and its associated storage unit set controlled by a new storage node. As used herein, a storage node that "fails" or dies is a storage node that will no longer control a set of storage units that it is controlling.

This can be, for example, due to an unexpected failure, a node going down to restart, or transferring for some other reason.

When a storage node receiving control for a set of storage units receives control, receiving storage node blocks host access requests to the set of storage units transferred. The receiving storage node processes the transaction logs to determine a subset of the set of the storage units that it is necessary to perform recovery on, for example, because those storage units have pending activity that has not been completed. Some recovery operations can be quickly performed by the receiving storage node while other recovery operations may take an extended period of time, for example, when an exception table or other meta-data needs to be loaded from a storage unit to perform recovery.

As such, in the example of paging in an exception table, a temporary exception table can be created instead of loading the exception table. Similarly, a corresponding temporary meta-data data structure can be created for other meta-data that may need to be paged in. The temporary exception table or temporary meta-data data structure would take time on the order of a memory allocation. Loading of the exception table can be queued in the background while the temporary exception table can be used to flag that the storage unit has one or more recovery operation pending and lock the storage unit from being accessed by a host. The temporary exception table can also include the associated recovery transaction or transactions. In some examples, the recovery transaction or operation includes a change to be made to the exception table. For example, suppose exception table A, entry 10 was empty, then host wrote to the location and a mapping to logical disk LD, offset 100, exception table A entry 10 will be updated to have this information after write completes. If node went down in between, then during recovery the system would create a recovery item denoting that entry 10 is to be updated with mapping to logical disk LD, offset 100. As used herein, virtual volumes and virtual volume pages can be referred to as virtual storage units while physical disks or drives such as logical disks can be referred to as storage units. The host IO requests can reference the virtual storage units, for example, by using a virtual identifier and offset. This virtual identifier and offset can be used to look up in a first level exception table, a second level exception table (similarly, the second level exception table can be used to look up a third, etc.). If a level of the exception tables are not in a main memory of the node receiving control, a temporary exception table can be made and referenced in a data structure (e.g., a hash table). That way if a host IO request comes in requesting the virtual storage unit, the node receiving control will know that a recovery operation is pending on the virtual storage unit and, thus, the storage unit.

Once the temporary exception tables are made from the processed transaction logs, the host access requests can be resumed. With this approach, just the storage units with pending recovery are locked from being accessible from the host access requests. Moreover, host access requests can resume for all of the storage units.

When a host access request is received, the receiving storage node can check its exception tables, including the temporary exception tables, using the data structure to determine whether the storage unit to be accessed has a pending recovery transaction associated. If there is not pending recovery transaction, then the IO can be processed normally. If there is a pending recovery transaction associated, the answer to the host request can wait for paging in of any needed exception tables, which can be prioritized compared to other recovery transactions. Then, the lock on the storage unit can be released and the host request can be answered using normal processes. In one example, the lock is the presence of the temporary exception table and unlocking can be performed by removing the temporary exception table from the data structure.

The aspects, features and advantages of the present disclosure will be appreciated when considered with reference to the following description of examples and accompanying figures. The following description does not limit the application; rather, the scope of the disclosure is defined by the appended claims and equivalents.

Figure 1:
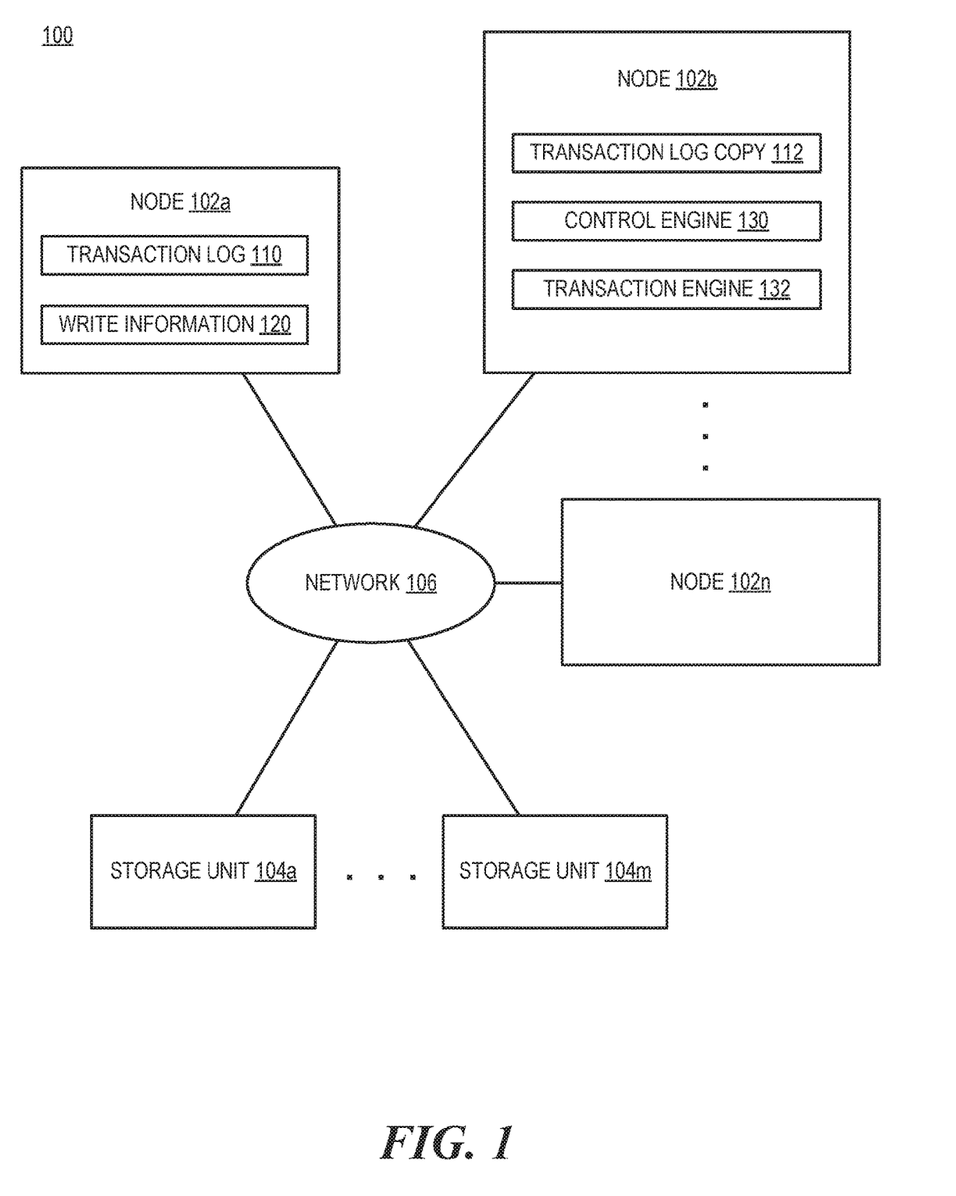
FIGS. 1 and 2 are block diagrams of computing systems capable of resuming host access requests after a node takes over control of storage units in a redundant system, according to various examples.
Figure 2:
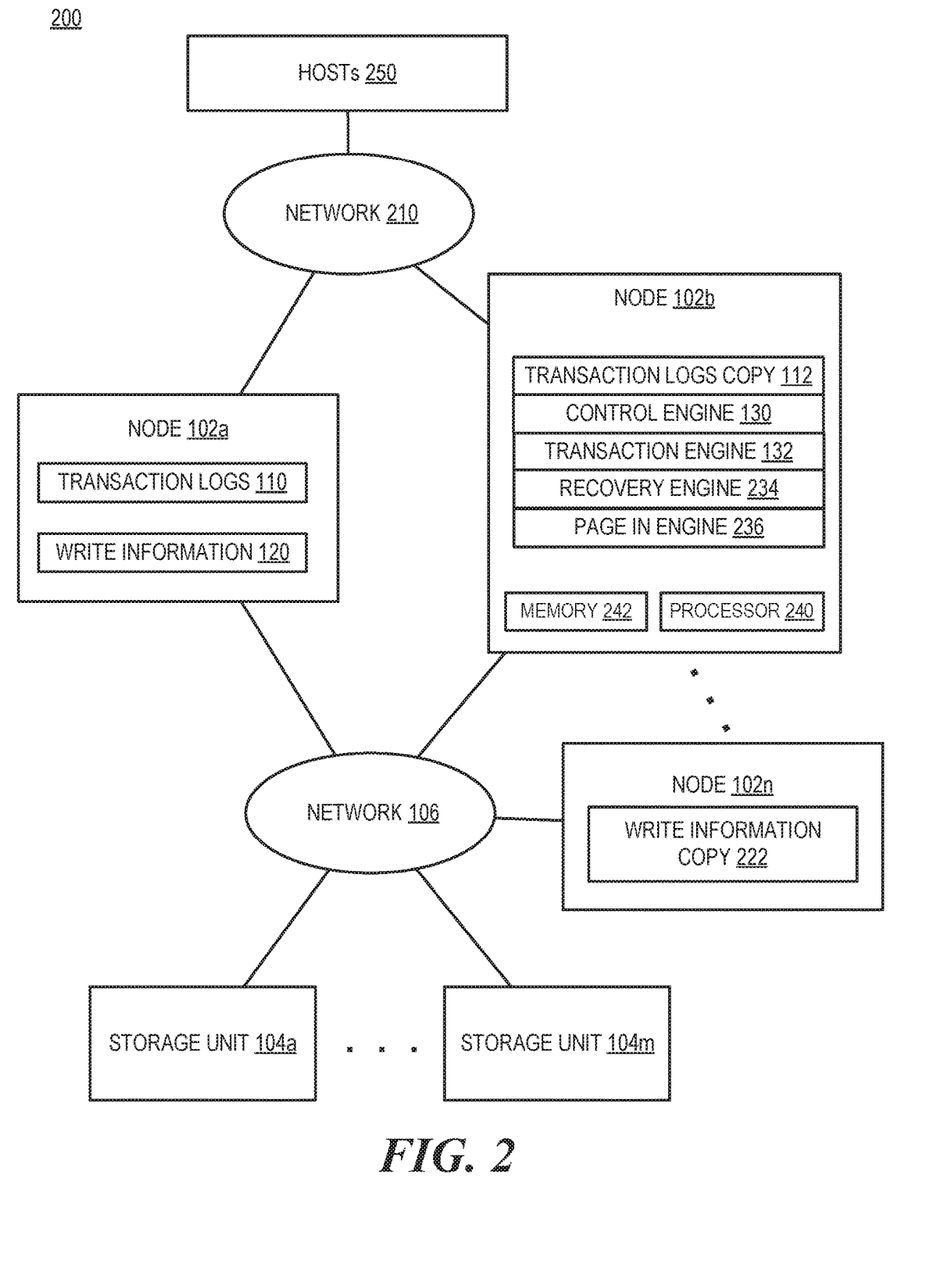

FIGS. 1 and 2 are block diagrams of computing systems capable of resuming host access requests after a node takes over control of storage units in a redundant system, according to various examples. In one example, system 100 can include a plurality of storage nodes or nodes 102a, 102b-102n that can be used to control storage units 104a-104m. The nodes 102 and storage units 104 can communicate via one or more network 106. In this example, node 102a can control a set of the storage units, for example, storage units 104b-104i (not shown) and include a transaction log 110. Further, the node 102a can include write information 120 from host requests that have not yet been written to the storage units 104b-104i. Node 102b can include a copy of the transaction log, or transaction log copy 112 as well as a control engine 130 to control access to storage units and a transaction engine 132 to process transaction logs.

Moreover, the example of FIG. 2 shows system 200, which further includes hosts 250 that request IO access to the storage units 104 from the nodes 102 via a network 210. In this example, node 102b further includes a recovery engine 234 and a page in engine 236 as well as at least one processor 240 and memory 242. Moreover, node 102n can include a copy of the write information 222.

As noted, node 102a can control storage units 104b-104i. The node 102a can manage transactions to and from the storage units 104b-104i. Managing transactions can include maintaining transaction logs described above including details of the transactions we well as managing associated write information. As noted above, the details of the transactions maintained in the transaction logs include a location of the write information, a location of a copy of the write information (on another node, for example, write information copy 222 on node 102n), updates to exception tables, and information about where (e.g., which storage unit) the write information is to be written (e.g., in the form of a LUN and offset that the host wrote to). As shown, node 102b includes a transaction log copy 112, which is a copy of the transaction logs 110. When node 102a fails, the system 100, 200 can be configured to have node 102b assume control over the set of storage units 104b-104i.

The control engine 130 can assume control over the set of storage units 104b-104i. Though the set is described in the numerals 104b-104i, the set does not need to be continuous. At this point, the system 100, 200 does not have at least two separate copies of the transaction logs and write information. As such, node 102b begins recovery operations. Control engine 130 can block host access requests to the set of storage units 104b-104i. Host requests can either return an error or be queued until processing resumes.

Transaction engine 132 processes the transaction logs to determine a subset of the set of the storage units to perform recovery for and to update a data structure such as a hash table or linked list to lock the subset of the storage units. As used herein, a subset includes at least one of the storage units from the set of storage units, but not all of the storage units from the set of storage units. In some examples, the data structure includes the type of information being stored, for example, a normal IO operation or a recovery operation. During normal operation, the data structure can be used to point out which data is in the cache. In some examples, the data structure, during this recovery, can be created or updated from the transaction logs. Processing can include playing back the transaction logs to create new copies of the write information and to create new transaction logs at another node or other nodes. In one example, the old transaction logs would have the location of the write information in node 102a and 102n. The new transaction logs would have the location of the write information at node 102n and another location (e.g., node 102b). In some examples, the node with the write information copy is actually node 102b and the copies of both the transaction logs and write information are on the same node.

During playback of the transaction logs copy 112, the playback can be sped up by using temporary meta-data data structures such as temporary exception tables. The recovery engine 234 can initiate recovery operations for the storage units from the subset of the storage units (e.g., storage units 104c-104h). For each of the recovery operations that are associated with a data structure, such as an exception table, it can be determined whether the meta-data or exception table needs to be paged in from a slower memory source than main memory of the node 102b or another one of the nodes 102 connected via a fast link (e.g., non-main-memory or a non-volatile memory). If so, a temporary meta-data data structure such as a temporary exception table is created and includes an associated recovery transaction (e.g., marking, in an exception table, a physical storage unit to be associated with a virtual volume in the transaction log). The temporary meta-data data structures, such as temporary exception tables can be created before host access requests are resumed.

As noted above, part of the recovery operations may include paging in of an exception table from a storage unit (e.g., a unit that is not main memory of the node 102b). A data structure, such as a hash table can be used to control exception tables and other temporary meta-data data structures (e.g., temporary exception tables). In some examples, the data structure can distinguish between normal IO transactions and recovery related IO transactions. For example, the exception tables and temporary exception tables can have a flag that distinguish them as the exception table or a temporary exception table. Storage units associated with the temporary exception tables can be considered implicitly locked. In other examples, an explicit lock can be used.

Once the temporary exception tables are in place, the control engine 130 can resume host access requests. In one example, a data structure can identify each of the temporary exception tables. Associated exception tables can be paged in in the background, for example, once the host access requests have been resumed. As such, the page in engine 236 can page in the exception tables from the slower memory to a main or volatile memory of the node 102b. As noted above, the exception tables can include mapping information for the write information. Resuming host access requests can mean that the host access requests are unblocked and are serviced and processed.

As noted above, the write information copy 222 can be caused to be copied by the recovery engine 234 to another node, for example, node 102b. Portions of the write information can be copied at a time as part of the processing of the transaction logs.

Once IO is resumed, the control engine 130 can receive requests from respective hosts 250 over network 210. The control engine 130 can receive a host request for storage unit 104c, which is part of the subset in this example. The control engine 130 can determine that the storage unit 104c is locked based on the hash table, based on looking at the temporary exception tables, or using a similar lookup. Based on the determination that the storage unit 104c is locked, performance of the recovery transaction(s) associated with the storage unit 104c are prioritized. The storage unit 104c can be unlocked for the host request once the recovery transaction is completed. Meanwhile, other IO to storage units from the set that were not locked can continue while recovery operations occur in the background. While waiting for the recovery transaction(s) for the storage unit 104c to complete, host access requests for the storage unit 104c can be paused.

Though the example above is related to exception tables and temporary exception tables. Similar approaches can be used when other meta-data (e.g., a bitmap or log page) is determined not to be located in a main memory of the controlling node 102b and required to be paged in from a slower memory source.

In certain examples, nodes 102 are computing devices, such as servers, client computers, desktop computers, mobile computers, etc. In other embodiments, the nodes 102 can include special purpose machines. The nodes 102 can be implemented via a processing element, memory, and/or other components.

The engines 130, 132, 234, 236 include hardware and/or combinations of hardware and programming to perform functions provided herein. Moreover, in some examples, modules (not shown) can include programing functions and/or combinations of programming functions to be executed by hardware to perform the functionality of the engines 130, 234, 236. When discussing the engines and modules, it is noted that functionality attributed to an engine can also be attributed to corresponding modules. Moreover, functionality attributed to a particular module and/or engine may also be implemented using another module and/or engine.

A processor 240, such as a central processing unit (CPU) or a microprocessor suitable for retrieval and execution of instructions and/or electronic circuits can be configured to perform the functionality of any of the engines 130, 132, 234, 236 described herein. In certain scenarios, instructions and/or other information, such as exception tables, temporary exception tables, hash tables, etc., can be included in memory 242 or other memory. Moreover, in certain examples, some components can be utilized to implement functionality of other components described herein. Input/output devices such as communication devices like network communication devices or wireless devices can also be included as components of the nodes.

Each of the engines may include, for example, hardware devices including electronic circuitry for implementing the functionality described herein. In addition or as an alternative, each module corresponding module may be implemented as a series of instructions encoded on a machine-readable storage medium of a node and executable by processor. It should be noted that, in some embodiments, some modules are implemented as hardware devices, while other modules are implemented as executable instructions.

Hosts 250, nodes 102, and storage units 104 may include network interface device(s) to communicate with other computing resource(s) (e.g., computing device(s)) via at least one computer network. As described herein, a computer network may include, for example, a local area network (LAN), a virtual LAN (VLAN), a wireless local area network (WLAN), a virtual private network (VPN), the Internet, or the like, or a combination thereof. In another example, the storage units 104 may be a storage device residing on a storage network, such as a Small Computer System Interface ("SCSI") device presented to a Storage Area Network ("SAN") using a Fibre Channel, Infiniband, or Internet Protocol ("IP") interface. It is understood that each storage unit 104a-104m may include any other type of storage unit and that the foregoing is a non-exhaustive list. In another example, storage units 104 may be configured as a volume that may be accessed via an operating system's logical interface.

Figure 3:
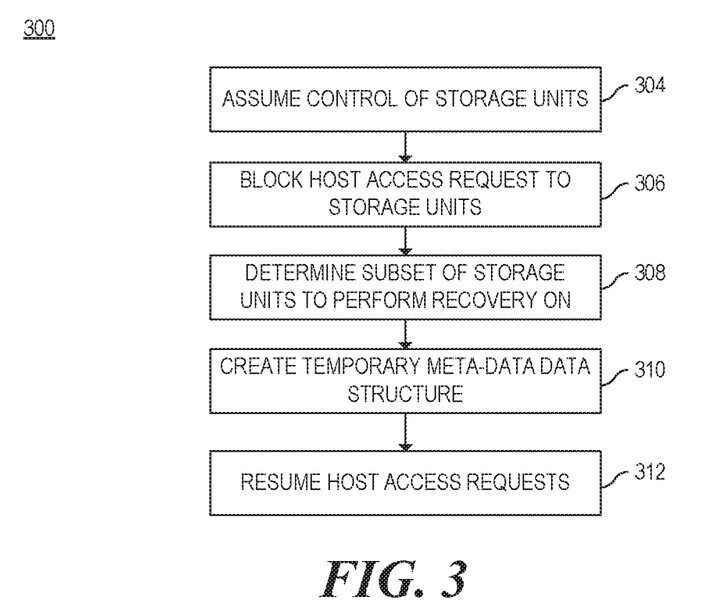
FIG. 3 is a flowchart of a method for using temporary meta-data data structures to expedite resumption of host access requests after a node takes over control of storage units in a redundant system, according to an example.
Figure 4:
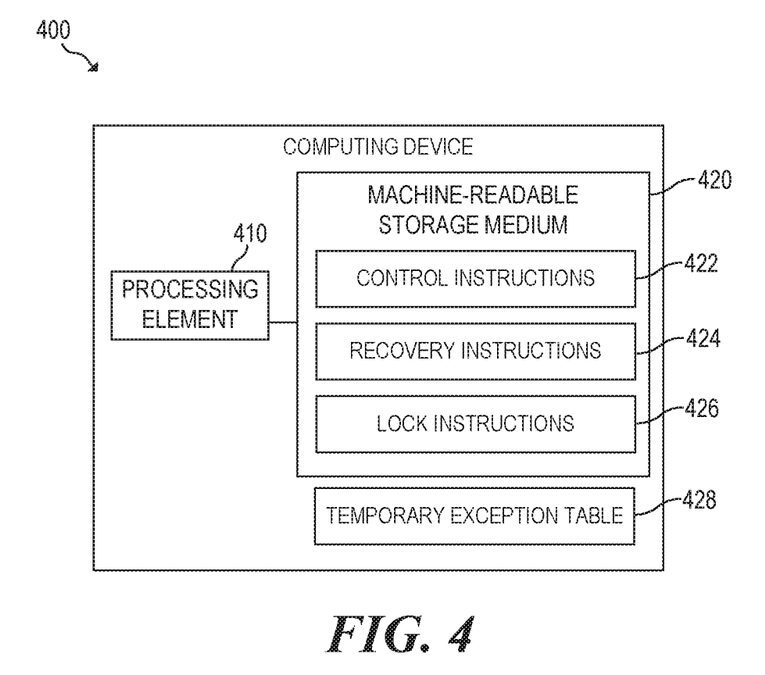
FIG. 4 is a block diagram of a computing device capable of using temporary meta-data data structures to expedite resumption of host access requests after a node takes over control of storage units in a redundant system, according to an example.

FIG. 3 is a flowchart of a method for using temporary meta-data data structures to expedite resumption of host access requests after a node takes over control of storage units in a redundant system, according to an example. FIG. 4 is a block diagram of a computing device capable of using meta-data data structures such as temporary exception tables to expedite resumption of host access requests after a node takes over control of storage units in a redundant system, according to an example. The computing device 400 can be a node that takes over duties to process storage units. The computing device 400 includes, for example, a processing element 410, and a machine-readable storage medium 420 including instructions 422, 424, 426 for using temporary exception tables to expedite resumption of host access requests in a fault tolerant system. Computing device 400 may be implemented as, for example, a notebook computer, a server, a workstation, or any other computing device.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426 to implement method 300. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for using temporary exception tables to expedite recovery of a fault tolerant storage system.

As noted above, a plurality of nodes (e.g., Node A-Node N) can be used in a fault tolerant system capable of storing information on storage units. Computing device 400 can be one of the nodes. The Nodes can be in charge of managing transactions to and from a number of storage units. Node A can have control of managing transactions to and from a set of the storage units. Moreover, Node A can include write information for the set of the storage units and can maintain corresponding transaction logs that include details of the transactions, such as the location of the write information, the location of a copy of the write information, updates needed to exception tables, and where the information is to be written. A second node (Node B), for example computing device 400, can include a copy of the transaction logs. The computing device 400 may also include the copy of the write information or the write information can be located on another one of the nodes. As noted above, Node A may fail.

When Node A fails, at 304, the processing element 410 can execute control instructions 422 to control assume control of the set of storage units that were controlled by Node A. In one example, the control can shift once a trigger condition or event occurs, for example, a lack of communication from Node A for a preset amount of time, an indication from Node A, etc.

At 306, the control instructions 422 can be executed to block host access requests to the set of storage units. This can be done to ensure that fault tolerance is present before allowing access to the storage units. As noted above, the blocking can be temporary to process the transaction logs and ensure fault tolerance.

At 308, the recovery instructions 424 are used to determine a subset of the set of the storage units to perform recovery for based on the copy of the transaction logs. The transaction logs can be processed to create a new set of transaction logs that point to the location of the copy of the write information as well as a new location for another copy of the write information on another node (Node C), the update to meta-data, and information about where the data is to be written. Recovery instructions 424 can also be used to cause the copying of the write information to Node C. Copying information between nodes can occur quickly (e.g., in the order of milliseconds), which may be more than a memory operation in a single node, but an order of magnitude faster than using another storage outside of main memory, such as a non-volatile storage such as a solid state drive or array, a hard disk drive or array, or other similar non-volatile memory.

During the processing of the transaction logs, a page in of an exception table may be required to complete the playback of the log. To shorten the time for recovery of the storage units in the set, at 310, the recovery instructions 424 can be used to create a temporary meta-data data structure, such as a temporary exception table 428 for one or more of the storage units from the subset. This can be based on a determination that the storage unit(s) is associated with one of the meta-data, such as exception tables, that is not stored in a main memory of the computing device 400. The temporary meta-data data structures can also serve as a lock on the subset of storage units. As such, lock instructions 426 can be executed to set the storage units as locked. As noted above, the lock can be implicit, for example, by marking the temporary meta-data data structure (e.g., temporary exception tables 428) as temporary or fake compared to normal exception tables used. Moreover, the fact that the temporary exception tables 428 are temporary can denote that the associated storage units are in recovery. As noted above, the temporary meta-data data structures such as the temporary exception table(s) 428 can be associated with a recovery transaction or operation or multiple recovery transactions or operations. Though the example used here is for an exception table and temporary exception table, the process used can also be used for other similar meta-data such as bitmaps and log pages using a temporary meta-data data structure.

The temporary meta-data data structure and/or a data structure pointing to the temporary meta-data data structure can indicate that the temporary meta-data data structure is associated with a recovery operation or transaction rather than normal IO.

At 312, the control instructions 422 can be executed by processing element 410 to resume host access requests for the set of storage units after creating the temporary meta-data data structures. Thus, IO requests to the storage units in the set can be resumed from the hosts before all recovery for the set is complete and two copies of the write information and new transaction logs are present. However, in the background, the meta-data such as exception tables, bitmaps, log pages, etc. are being paged in and the storage units still in recovery are still locked using the temporary meta-data data structures. A data structure (e.g., a hash table, linked list, etc.) can be updated to lock and unlock the subset of storage units based on the transaction logs. As noted above, the lock can be implicit (e.g., existence of a temporary exception table or temporary meta-data data structure referencing the storage unit (e.g., using a virtual identifier and offset)) or explicit.

Figure 5:
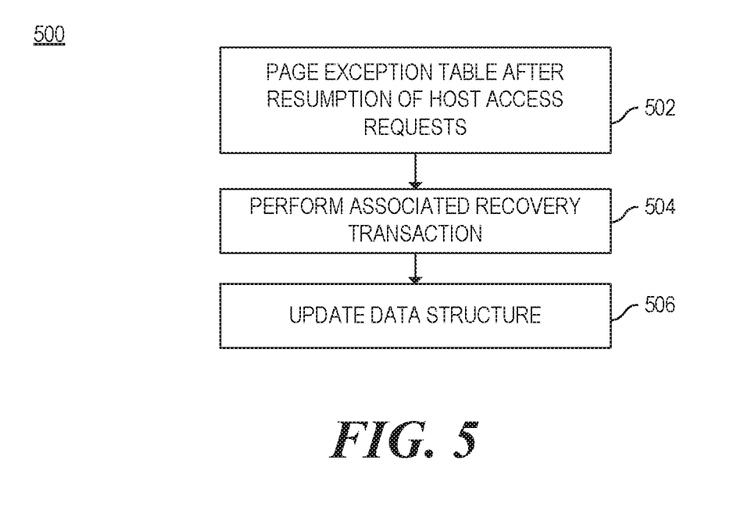
FIG. 5 is a flowchart of a method for paging in an exception table during recovery, according to an example.

FIG. 5 is a flowchart of a method for paging in an exception table during recovery, according to an example. Although execution of method 500 is described below with reference to computing device 400, other suitable components for execution of method 500 can be utilized (e.g., node 102*b*). Additionally, the components for executing the method 500 may be spread among multiple devices. Method 500 may be implemented in the form of executable instructions stored on a machine-readable storage medium, such as storage medium 420, and/or in the form of electronic circuitry. Though this method 500 focuses in on one exception table, the process can be implemented for multiple exception tables serially or in parallel.

At 502, an exception table is paged in to main memory of the computing device 400 after host access requests are resumed. In this example, the time the exception table is paged in is the time that the page in is completed. As such, the page in process can begin before host access requests are resumed by computing device 400. In one example, a data structure (e.g., a linked list or table) can be used to identify each of the temporary exception tables and can be used to process the paging in and associated recovery transactions or operations.

At 504, the associated recovery transactions for the temporary exception table are performed using recovery instructions 424. As noted above, in one example, the recovery operation can be a change that needs to be made to the exception table. Moreover, the associated recovery transaction(s) can be implemented as a background process. For example, suppose exception table A, entry 10 was empty, then host wrote the location and Node A allocates a mapping to logical disk LD, offset 120, exception table A entry 10 will be updated to have this information after write to the storage unit completes. If Node A went down in between, then during recovery, the computing device 400 would create a recovery item denoting that entry 10 needs to be updated with mapping to logical disk LD, offset 120.

At 506, the data structure managing locks for the storage units is updated using lock instructions 426. In one example, the update includes removing the temporary exception table, which also removes locking of the storage unit. As such, the data structure is updated to remove indication that the storage unit has an associated recovery transaction pending. In another example, an explicit lock on the storage unit can be remove. In some examples, the lock on the storage unit may also include a larger storage container including the storage unit, for example, if the storage unit is LD offset 120, LD offset 120 can be locked or a larger portion of the LD may be locked to IO during recovery.

Figure 6:
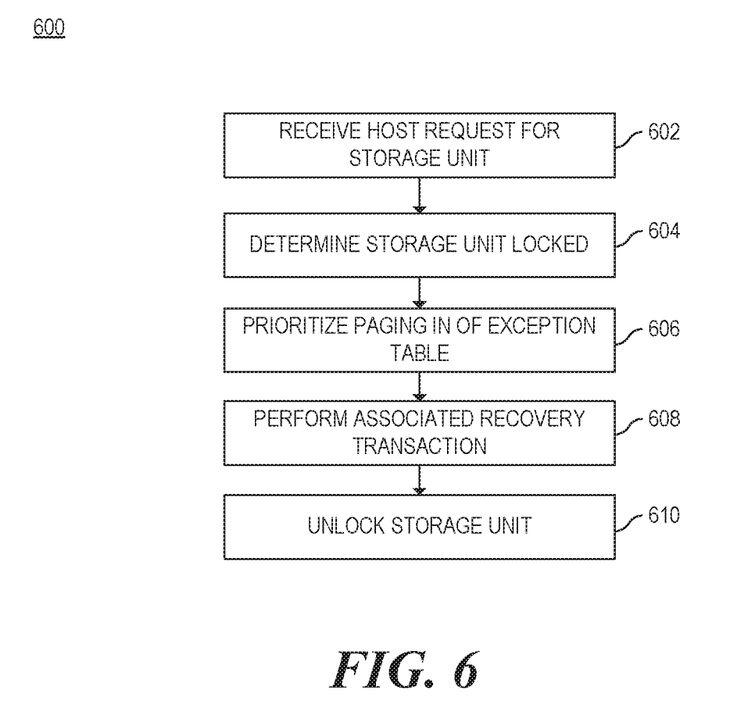
FIG. 6 is a flowchart of a method for prioritizing paging in of an exception table based on a request from a host, according to an example.

FIG. 6 is a flowchart of a method for prioritizing paging in of an exception table based on a request from a host, according to an example. Although execution of method 600 is described below with reference to computing device 400, other suitable components for execution of method 600 can be utilized (e.g., node 102*b*). Additionally, the components for executing the method 600 may be spread among multiple devices. Method 600 may be implemented in the form of executable instructions stored on a machine-readable storage medium, such as storage medium 420, and/or in the form of electronic circuitry. Though this method 600 focuses in on one storage unit, the process can be implemented for other storage units.

At 602, the computing device 400 receives a host request from a host for access to a storage unit. Lock instructions 426 can be executed to determine whether the storage unit is locked (604). For example, the presence of a temporary exception table associated with the storage unit can mean that the storage unit is locked.

If the storage unit is locked, at 606, the recovery instructions 424 can be executed to prioritize paging in of an exception table associated with the storage unit into a main memory of the computing device 400. Further the associated recovery transaction can be performed (608). As noted above, the associated recovery transaction can be an update of the exception table that is paged in. In some examples, when the exception table is updated, the exception table can be marked dirty and later flushed to non-volatile storage that the exception table was paged in from. In other examples, the associated recovery transaction may also include causing a portion of a copy of the write information to be copied from one node to another to ensure fault tolerance. At 610, the storage unit can be unlocked. As noted above, the unlocking can be performed as an update to a data structure. Then, the host request can be performed.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system comprising:
a plurality of nodes for managing transactions to and from a plurality of storage units and for maintaining transaction logs including details of the transactions,
wherein a first one of the nodes controls a set of the storage units and includes write information for the set of storage units and maintains corresponding transaction logs for the write information,
wherein a second one of the nodes includes a copy of the transaction logs, the second one node further comprising:
a control engine to assume control over the set of storage units and to block host access requests to the set of storage units;
a transaction engine to process the transaction logs to determine to perform recovery for a subset of the set of the storage units and to update a hash table to lock the subset of the storage units,
wherein the control engine is further to resume host access requests before recovery is complete for the subset of the set of the storage units.

2. The system of claim 1, the second node further comprising:
a recovery engine to:
initiate a plurality of recovery operations for the storage units from the subset, wherein each of the recovery operations is associated with one of a plurality of meta-data;
for each of the recovery operations, determine that the respective meta-data is stored in a non-volatile memory; and
based on each determination, create, for each respective meta-data, a temporary meta-data data structure, wherein the temporary meta-data data structure includes an associated recovery transaction,
wherein the temporary meta-data data structure are created before the host access requests are resumed.

3. The system of claim 2, further comprising:
a page in engine to page in the respective meta-data to a volatile memory from the non-volatile memory that is associated with the temporary meta-data data structures using a background process.

4. The system of claim 1, wherein the second node further comprises:
a recovery engine to:
initiate a recovery operation for a first one of the storage units from the subset;
determine that an exception table for the first one storage unit that includes mapping information is stored on a non-volatile memory; and
based on the determination, create a temporary exception table for the one storage unit and include an associated recovery transaction before the host access requests are resumed.

5. The system of claim 4, wherein the second node further comprises:
a page in engine to page in the mapping information to volatile memory from the non-volatile memory that is associated with the temporary exception table after the host access requests are resumed.

6. The system of claim 5, wherein a third one of the nodes includes a copy of the write information and wherein the recovery engine is further to:
copy a first portion of the write information on the third node to the second node based on the transaction logs.

7. The system of claim 5, wherein the control engine is further to:
receive a host request for the first one storage unit;
determine that the first one storage unit is locked based on the hash table;
prioritize performance of the associated recovery transaction; and
unlock the first one storage unit for the host request.

8. The system of claim 7, wherein the control engine is further to:
pause host access requests for the first one storage unit while the associated recovery transaction is performed.

9. A method comprising:
controlling, at a first node of a plurality of nodes that are used to manage transactions to and from a plurality of storage units, a set of the storage units,
wherein the first node includes write information for the set of the storage units and maintains corresponding transaction logs that include details of the transactions,
wherein a second node of the nodes includes a copy of the transaction logs, assuming control, by the second node, of the set of the storage units;
blocking host access requests to the set of storage units;

determining to perform recovery for a subset of the set of the storage units based on the copy of the transaction logs;

creating a temporary exception table for one of the storage units from the subset based on a determination that the one storage unit is associated with one of a plurality of meta-data that is not stored in a main memory of the second node; and resuming the host access requests for the set of storage units after creating the temporary meta-data.

10. The method of claim 9, further comprising:

updating a data structure to lock the subset of the storage units based on the copy of the transaction logs.

11. The method of claim 10, wherein the one meta-data is an exception table and the temporary meta-data is a temporary exception table and wherein the temporary exception table is created to include at least one associated recovery transaction, the method further comprising:

paging in the one exception table to the main memory of the second node after resumption of the host access requests; and performing the associated recovery transaction after resumption of the host access requests; and updating the data structure to remove indication that the first storage unit has the associated recovery transaction.

12. The method of claim 10, wherein the temporary meta-data is created to include an associated recovery transaction, the method further comprising:

receiving a host request for the one storage unit;

determining, based on the data structure, that the one storage unit is locked;

prioritizing paging in the one meta-data to the main memory of the second node and performing the associated recovery transaction; and updating the data structure to unlock the one storage unit.

13. The method of claim 9, wherein the host access requests are resumed before recovery is complete for the subset of the set of storage units.

14. A non-transitory machine-readable storage medium storing instructions that, if executed by a physical processing element of a computing device, cause the computing device to:

assume control, in a system where a plurality of nodes are used to manage transactions to and from a plurality of storage units, of a set of storage units previously controlled by a first one of the nodes, wherein the first node includes write information for the set of the storage units and maintains corresponding transaction logs that include details of the transactions;

wherein the device includes a copy of the transaction logs;

block host access requests to the set of storage units;

determine to perform recovery for a subset of the set of the storage units based on the copy of the transaction logs;

update a data structure to lock the subset of the storage units based on the copy of the transaction logs;

create a temporary exception table for one of the storage units from the subset based on a determination that the one storage unit is associated with an exception table that is not stored in a main memory of the device, wherein the temporary exception table includes an associated recovery transaction; and resume the host access requests for the set of storage units after creating the temporary exception table.

15. The non-transitory machine-readable storage medium of claim 13, further comprising instructions that, if executed by the physical processing element, cause the computing device to:

page in the exception table to the main memory of the device after resumption of the host access requests; and perform the associated recovery transaction after resumption of the host access requests; and unlock the one storage unit.

16. The non-transitory machine-readable storage medium of claim 14, further comprising instructions that, if executed by the physical processing element, cause the computing device to:

receive a host request for the one storage unit;

determine, based on the data structure, that the one storage unit is locked;

prioritize paging in the exception table to the main memory of the device;

perform the associated recovery transaction, wherein the recovery transaction includes causing a portion of a copy of the write information on a second one of the nodes to be copied to the device; and update the data structure to unlock the one storage unit.

17. The non-transitory machine-readable storage medium of claim 14, wherein the host access requests are resumed before recovery is complete for the subset of the set of storage units.

* * * * *